(12) United States Patent
Melanson et al.

(10) Patent No.: US 10,917,013 B2
(45) Date of Patent: Feb. 9, 2021

(54) AUGMENTED MULTI-STAGE BOOST CONVERTER

(71) Applicant: Cirrus Logic International Semiconductor Ltd., Edinburgh (GB)

(72) Inventors: John L. Melanson, Austin, TX (US); Eric J. King, Austin, TX (US); Jason W. Lawrence, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/692,072

(22) Filed: Nov. 22, 2019

(65) Prior Publication Data

US 2020/0204076 A1 Jun. 25, 2020

Related U.S. Application Data

(60) Provisional application No. 62/783,513, filed on Dec. 21, 2018.

(51) Int. Cl.
*H02M 3/158* (2006.01)
*H02M 1/00* (2006.01)
(Continued)

(52) U.S. Cl.
CPC .......... *H02M 3/1582* (2013.01); *H01F 27/28* (2013.01); *H02M 3/158* (2013.01);
(Continued)

(58) Field of Classification Search
CPC ........ H02M 3/158; H02M 2001/0064; H02M 2001/007; H02M 1/40; H02M 1/44; H01F 27/28; H01F 38/023; H01F 2038/026
See application file for complete search history.

(56) References Cited

U.S. PATENT DOCUMENTS 5,510,974 A * 4/1996 Gu ...................... H02M 1/4258
363/134
9,691,538 B1 * 6/2017 Ikriannikov .............. H01F 3/10
(Continued)

FOREIGN PATENT DOCUMENTS

DE 102016120221 A1 6/2017
EP 1808952 A2 7/2007
(Continued)

OTHER PUBLICATIONS

Forsyth, Andrew J. et al., Sampled-Data Analysis of the Dual-Interleaved Boost Converter with Interphase Transformer, IEEE Transactions on Power Electronics, vol. 27, No. 3, Mar. 2012, pp. 1338-1346.

(Continued)

*Primary Examiner* — Thienvu V Tran
*Assistant Examiner* — Sisay G Tiku
(74) *Attorney, Agent, or Firm* — Jackson Walker L.L.P.

(57) ABSTRACT

A boost converter may include a first stage comprising a first dual anti-wound inductor constructed such that its windings generate opposing magnetic fields in its magnetic core, and a second stage comprising a second dual anti-wound inductor constructed such that its windings generate opposing magnetic fields in its magnetic core. The boost converter may also include control circuitry for controlling the first stage and the second stage to have a plurality of phases comprising a first phase wherein a first coil of the first dual anti-wound inductor and a second coil of the second dual anti-wound inductor are coupled in parallel between a power supply and a ground voltage and a second phase wherein the first coil of the first dual anti-wound inductor and the second coil of the second dual anti-wound inductor are coupled in series between the power supply and the ground voltage.

15 Claims, 13 Drawing Sheets

(51) Int. Cl.
*H02M 1/40* (2007.01)
*H02M 1/44* (2007.01)
*H01F 27/28* (2006.01)
*H01F 38/02* (2006.01)

(52) U.S. Cl.
CPC .......... *H02M 2001/007* (2013.01); *H02M 2001/0064* (2013.01)

(56) References Cited

U.S. PATENT DOCUMENTS

| | | | |
|---|---|---|---|
| 10,020,109 B1* | 7/2018 | Ikriannikov | H02M 1/15 |
| 10,516,337 B2* | 12/2019 | Ojika | H02M 1/14 |
| 2005/0040800 A1* | 2/2005 | Sutardja | H02M 3/1584 |
| | | | 323/283 |
| 2006/0103359 A1* | 5/2006 | Watanabe | H02M 3/1584 |
| | | | 323/225 |
| 2010/0195361 A1* | 8/2010 | Stem | H02M 7/5387 |
| | | | 363/132 |
| 2011/0025289 A1 | 3/2011 | Wang et al. | |
| 2012/0319478 A1* | 12/2012 | Gentchev | H02M 1/14 |
| | | | 307/28 |
| 2014/0016371 A1* | 1/2014 | Chandrasekaran | H01F 27/28 |
| | | | 363/21.12 |
| 2014/0185328 A1 | 7/2014 | Rosado et al. | |
| 2015/0365005 A1 | 12/2015 | Panov et al. | |
| 2017/0085189 A1* | 3/2017 | Madsen | H02M 3/33546 |

FOREIGN PATENT DOCUMENTS

| | | |
|---|---|---|
| EP | 2506413 A2 | 10/2012 |
| WO | 2015037204 A1 | 3/2015 |

OTHER PUBLICATIONS

Le Bolloch, Mathieu et al., Current-Sharing Control Technique for Interleaving VRMs using Intercell Transformers, 2009 13th European Conference on Power Electronics nad Applications, Sep. 8-10, 2009, Barcelona, ES.

Ogata Katsuhiko, Discrete-Time Control Systems, Prentice Hall, 1995, pp. 377-517.

Simon, Dan, Optimal State Estimation, Wiley 2006: pp. 123-145 (Chapter 5).

Erickson, Robert W. and Maksimociv, D., Fundamentals of Power Electronics: Second Edition, Springer Science+Business Media, 2001: pp. 213-226 (Chapter 7.3).

International Search Report and Written Opinion of the International Searching Authority, International Application No. PCT/US2019/067241, dated Mar. 30, 2020.

International Search Report and Written Opinion of the International Searching Authority, International Application No. PCT/US2019/066778, dated Mar. 19, 2020.

* cited by examiner

P₁ ASSERTED

P₁ DEASSERTED

AUGMENTED MULTI-STAGE BOOST CONVERTER

RELATED APPLICATION

The present disclosure claims priority to U.S. Provisional Patent Application Ser. No. 62/783,513, filed Dec. 21, 2018, which is incorporated by reference herein in its entirety.

FIELD OF DISCLOSURE

The present disclosure relates in general to circuits for audio devices, piezoelectric devices, haptic-feedback devices, and/or other devices, including without limitation personal audio devices such as wireless telephones and media players, and more specifically, to an augmented multi-stage boost converter that may be used in such devices.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones, one or more speakers, a piezoelectric transducer, a haptic feedback transducer, and/or other transducer. Such circuitry often includes a driver including a power amplifier for driving a transducer output signal to the transducer. Oftentimes, a power converter may be used to provide a supply voltage to a power amplifier in order to amplify a signal driven to speakers, headphones, piezoelectric transducers, haptic feedback transducers, or other transducers. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier.

Battery-powered systems may use a boost converter to generate a power supply for an audio amplifier that is greater than a voltage of the battery. For example, a motivation for using a boost converter in a battery-powered transducer is to generate a greater signal swing at the output of a transducer amplifier than could be achieved by powering the amplifier directly from the battery.

Traditionally, while a boost converter and an amplifier powered from the boost converter are often manufactured on the same integrated circuit, boost converters often required a boost inductor external to the integrated circuit, which requires significant space. However, recent advances in manufacturing have enabled the integration of inductors with a magnetic core into an integrated circuit die. Advantages of an integrated inductor may include smaller total circuit area, significant reduction in height in a direction perpendicular to a surface of the integrated circuit, lower electromagnetic interference emissions, and less variation of inductor physical properties.

Despite the advances in inductor manufacturing, designing a boost converter with an integrated inductor may be challenging. External boost converter inductors for audio applications generally have inductances between 1 μH and 2 μH and saturate at between 2.5 A and 4 A of current. However, a typical integrated inductor may have an inductance in the range of tens to hundreds of nanohenries with a current saturation limit at or less than 1 A. A typical boost converter for audio may supply 12V into a 10 W load from a 4V battery supply. Thus, even assuming 100% efficiency, a standard boost converter design may draw 2.5 A input current, which is well beyond the saturation point of the integrated inductor. A multi-phase converter could be used to distribute the current to multiple inductors, but the small inductance causes a large current ripple that may still exceed the saturation constraint.

To use an integrated inductor, the design of a power converter must overcome the limitations of its low inductance and low saturation current. One solution to this problem is to use a multi-wound inductor with a modified boost converter architecture.

A multi-wound inductor may be used to weaken the magnetic field in the core and prevent early saturation. FIG. 1A depicts a multi-wound inductor 100 with two coils 102a and 102b wrapped around a common magnetic core 104. FIG. 1B depicts a cross-sectional side view of inductor 100 depicting current flow in each of coils 102a and 102b, with "•" depicting a current $I_1$ flowing out of the page in a direction perpendicular to the plane of the page and with "X" depicting a current $I_2$ flowing into the page in a direction perpendicular to the plane of the page. Coils 102a and 102b may be wound in opposite directions such that positive current generates opposite fields in each coil. Therefore, a total magnetic flux $\phi_M$ through magnetic core 104 may equal the difference between the magnetic flux $\phi_{M1}$ from coil 102a and the magnetic flux $\phi_{M2}$ from coil 102b. Magnetic fluxes $\phi_{M1}$, $\phi_{M2}$, in coil 102a, 102b may be proportional to currents $I_1$ and $I_2$, respectively, in such coil 102a, 102b.

Inductor 100 may saturate when the magnetic field in magnetic core 104 exceeds a threshold, $B_{sat}$. The magnetic field may be proportional to the total magnetic flux $\phi_M$ in magnetic core 104, which may therefore be proportional to the difference in currents (e.g., $I_1 - I_2$). As a result, a saturation constraint for inductor 100 may be given as:

$$I_{diff}^{sat} \geq |I_1 - I_2| \qquad (1)$$

where $I_{diff}^{sat}$ is a difference between current $I_1$ and current $I_2$ that saturates inductor 100 and may typically be around 0.5 A-1.0 A for an integrated inductor. Equation (1) above may only be valid for low to moderate levels of current. FIG. 1C illustrates a saturation profile of current $I_2$ versus current $I_1$. Dashed lines depict saturation boundaries 108 from equation (1) whereas the hatched region depicts the true saturation region 110 defined by the boundary ABCDE. For low currents, the unsaturated region 112 is a strip along the main diagonal as described by equation (1). However, at larger currents the unsaturated region 112 shrinks in width until, at very large currents, inductor 100 is always saturated. This effect may occur because the field cancellation between coils 102a and 102b may not be perfect, especially at their respective ends. Also, some inductor designs may use extra turns in one of coils 102a, 102b to control a coupling coefficient which may further reduce the field cancellation. As a result, inductor 100 may saturate even though the current difference $|I_1 - I_2|$ is within its limits. Thus, the condition of equation (1) may represent a necessary (but not a sufficient) condition for saturation. Instead, a sufficient condition for inductor 100 to be unsaturated is that currents $I_1$ and $I_2$ must lie in unsaturated region 112 defined by points ABCDE.

A multi-wound inductor may extend the range of winding currents that may be used before the device is saturated. For example, if current $I_2$ is zero, current $I_1$ may only extend to point E in FIG. 1C and remain unsaturated. However, with a properly chosen value for current $I_2$, the range of current $I_1$ can be extended to point D or even point C and remain unsaturated due to the field cancellation of currents $I_1$ and $I_2$. This range extension can be used to help with the saturation problem of integrated boost inductors. However, the boost architecture must also be designed to take advantage of the benefits of a multi-wound inductor.

FIG. 2 depicts one example of a single-stage boost converter 200 that may be used with a multi-wound inductor 100 and having a load 202. Single-stage boost converter 200 may use capacitor 204 to stabilize its output voltage $V_{out}$. A battery 206 may supply single-stage boost converter 200 with an input voltage $V_{in}$. Single-stage boost converter 200 may comprise a plurality of switches 210, 212, 214, and 216, each switch having a gate G to receive a control signal to control the conductivity of such switch (e.g., to selectively open and close such switch). Such control signals may comprise pulse-width modulation control signals labeled $P_1$ and $P_2$ in FIG. 2, along with their respectively logical complements, signals labeled $\overline{P_1}$ and $\overline{P_2}$ in FIG. 2. Switches 210 and 212 may toggle top coil 102a of inductor 100 between a charging state in which coil 102a is coupled between battery 206 and ground and a transfer state wherein coil 102a is coupled between power supply 206 and load 202. Likewise, switches 214 and 216 may toggle bottom coil 102b of inductor 100 between a charging state in which coil 102b is coupled between battery 206 and ground and a transfer state wherein coil 102b is coupled between power supply 206 and load 202. The boost voltage ratio, $V_{out}/V_{in}$, may be related to the pulse-width modulation duty cycle D of control signals $P_1$ and $P_2$ with an equation that is very similar to that of a standard boost converter:

$$\frac{V_{out}}{V_{in}} = \frac{1}{1-D} \qquad (2)$$

assuming no inductor or switching losses.

Single-stage boost converter 200 depicted in FIG. 2 may not prevent the multi-wound inductor from saturating at realistic boost voltages and output powers. For example, FIG. 3A depicts a circuit simulation of currents $I_1$ and $I_2$ for a single-stage boost converter 200 over one pulse-width modulation cycle, with an output voltage $V_{out}$ of 12 V, an output power of 10 W, and an input voltage $V_{in}$ of 4 V, which may represent standard nominal operation conditions for a boost converter in an audio application. The simulation results as depicted in FIG. 3A also model resistive losses in switches 210, 212, 214, and 216 and inductor 100. FIG. 3B depicts current difference $I_1-I_2$ and saturation level $I_{diff}^{sat}$ for inductor 100. FIG. 3C depicts currents $I_2$ versus $I_1$ on a plot along with the saturation boundary $I^{sat}$ also plotted in FIG. 3C, showing that although current difference $I_1-I_2$ remained below saturation level $I_{diff}^{sat}$ in FIG. 3B, their individual amplitudes exceeded saturation boundary $I^{sat}$ in FIG. 3C. Accordingly, single-stage boost converter 200 may not be useful for a desired application.

FIG. 4 depicts one example of a two-stage boost converter 400 that may be used with multi-wound inductor 100 and having a load 202. Each stage 401a, 401b of two-stage boost converter 400 may be identical to single-stage boost converter 200 shown in FIG. 2, and stages 401a, 401b may be coupled in series. One disadvantage to two-stage boost converter 400 is that it requires two capacitors, 204 and 205, to stabilize the output of each stage 401 compared to the single capacitor 204 required for single-stage converter 200. Both capacitors 204 and 205 may be large and may contribute significantly to the total circuit area.

In the architecture of two-stage boost converter 400, the boosted output of first stage 401a supplies the input voltage to second stage 401b. Therefore, the total boost ratio of both stages 401 is the product of the boost ratio of each stage 401a, 401b. Because both stages 401a, 401b may operate with identical duty cycles, the total boost ratio of two-stage boost converter 400 may be given as:

$$\frac{V_{out}}{V_{in}} = \left(\frac{1}{1-D}\right)^2 \qquad (3)$$

assuming no inductor or switching losses. Comparing equation (3) with equation (2), two-stage boost converter 400 may require a lower duty cycle than single-stage boost converter 200 to achieve the same boost voltage ratio. For example, to boost from 4V to 12V, single-stage boost converter 200 may require a duty cycle of 0.67 versus 0.42 for the two-stage boost converter 400. A lower duty cycle may decrease the magnitude of the current ripple, which should help prevent saturation.

FIG. 5A depicts a circuit simulation of currents $I_{1\text{-}STAGE1}$, $I_{2\text{-}STAGE1}$, $I_{1\text{-}STAGE2}$, and $I_{2\text{-}STAGE2}$ for two-stage boost converter 400 over one pulse-width modulation cycle. A comparison of FIG. 5A with FIG. 3A shows that coil current ripple amplitude may be significantly reduced. FIG. 5B depicts current difference $I_{1\text{-}STAGE1}-I_{2\text{-}STAGE1}$, current difference $I_{1\text{-}STAGE2}-I_{2\text{-}STAGE2}$, and saturation level $I_{diff}^{sat}$ for inductors 100. FIG. 5C depicts currents $I_{2\text{-}STAGE1}$ versus $I_{1\text{-}STAGE1}$ and currents $I_{2\text{-}STAGE2}$ versus $I_{1\text{-}STAGE2}$ on a plot along with the saturation boundary $I^{sat}$ also plotted in FIG. 5C. In comparing FIGS. 5B and 5C to FIGS. 3A and 3B, respectively, the over-saturation issues of single-stage boost converter 200 are shown to be greatly improved. The currents of inductor 100 of first stage 401a may now be within saturation limits. However, the currents of inductor 100 of second stage 401b may still exceed saturation limits. The problem with two-stage boost converter 400 may be that even though the duty cycle is smaller, second stage 401b is sourced from the output of first stage 401a, which is at a higher voltage than voltage $V_{in}$ of battery 206. Therefore, inductor 100 of second stage 401b may experience a larger voltage drop when control signal $P_1$ is asserted, and that may cause the large current difference $I_{1\text{-}STAGE2}-I_{2\text{-}STAGE2}$ shown in FIG. 5B.

Thus, neither single-stage boost converter 200 nor two-stage boost converter 400 may satisfy the saturation constraints of inductor 100 for desired applications.

By including discussion in this Background section, Applicant is making no admission that any of the content of this Background section is prior art that may be used to support a prior-art based rejection of the recited claims.

SUMMARY

In accordance with the teachings of the present disclosure, one or more disadvantages and problems associated with existing inductor-based power converters may be reduced or eliminated.

In accordance with embodiments of the present disclosure, a boost converter may include a first stage comprising a first dual anti-wound inductor constructed such that its windings generate opposing magnetic fields in its magnetic core, and a second stage comprising a second dual anti-wound inductor constructed such that its windings generate opposing magnetic fields in its magnetic core. The boost converter may also include control circuitry for controlling the first stage and the second stage to have a plurality of phases comprising a first phase wherein a first coil of the first dual anti-wound inductor and a second coil of the second dual anti-wound inductor are coupled in parallel between a power supply and a ground voltage and a second phase wherein the first coil of the first dual anti-wound inductor and the second coil of the second dual anti-wound inductor are coupled in series between the power supply and the ground voltage.

In accordance with these and other embodiments of the present disclosure, an electronic device may include at least one circuit configured to receive a boosted voltage as a supply voltage to the at least one circuit and a boost converter. The boost converter may include a first stage comprising a first dual anti-wound inductor constructed such that its windings generate opposing magnetic fields in its magnetic core, and a second stage comprising a second dual anti-wound inductor constructed such that its windings generate opposing magnetic fields in its magnetic core. The boost converter may also include control circuitry for controlling the first stage and the second stage to have a plurality of phases comprising a first phase wherein a first coil of the first dual anti-wound inductor and a second coil of the second dual anti-wound inductor are coupled in parallel between a power supply and a ground voltage and a second phase wherein the first coil of the first dual anti-wound inductor and the second coil of the second dual anti-wound inductor are coupled in series between the power supply and the ground voltage.

In accordance with these and other embodiments of the present disclosure, a method may include, in a boost converter having a first stage comprising a first dual anti-wound inductor constructed such that its windings generate opposing magnetic fields in its magnetic core and a second stage comprising a second dual anti-wound inductor constructed such that its windings generate opposing magnetic fields in its magnetic core, controlling the first stage and the second stage to have a plurality of phases comprising a first phase wherein a first coil of the first dual anti-wound inductor and a second coil of the second dual anti-wound inductor are coupled in parallel between a power supply and a ground voltage and a second phase wherein the first coil of the first dual anti-wound inductor and the second coil of the second dual anti-wound inductor are coupled in series between the power supply and the ground voltage.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 6:
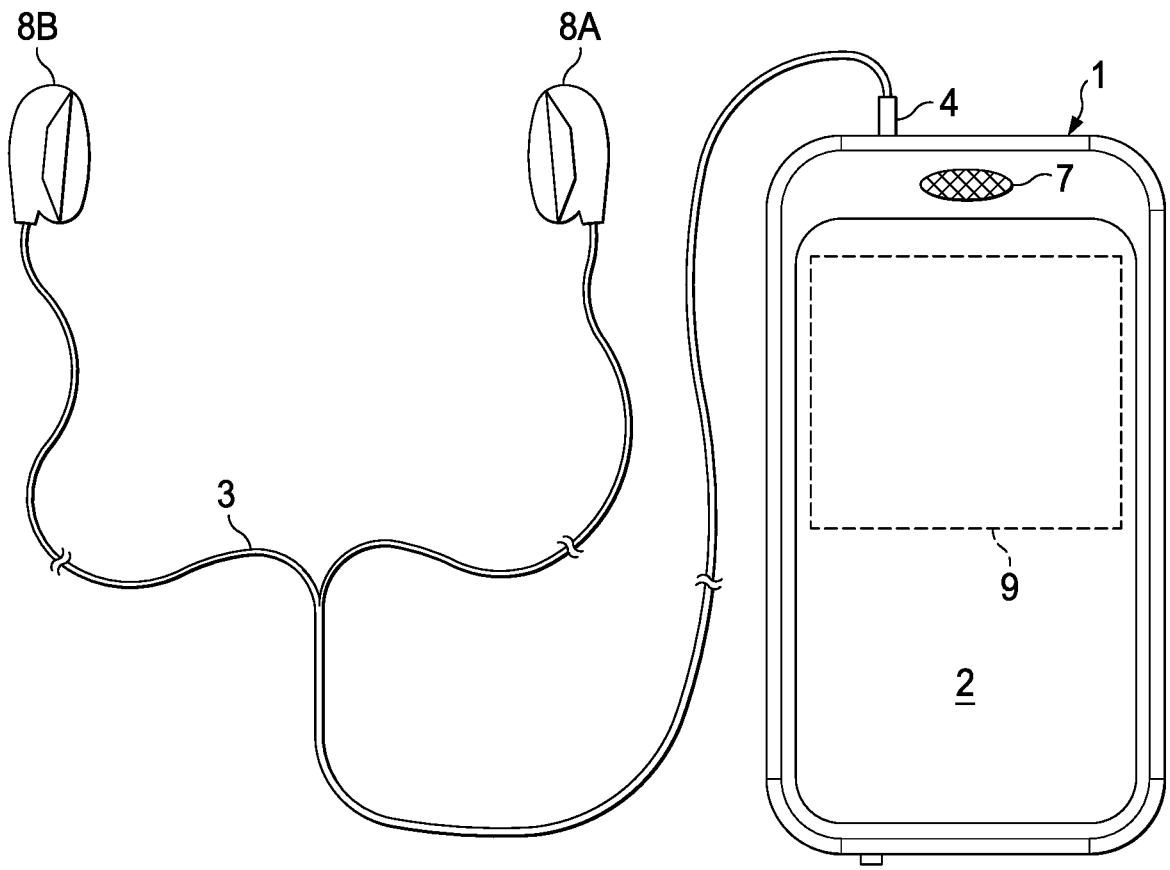
FIG. 6 illustrates selected components of an example personal mobile device, in accordance with embodiments of the present disclosure.

FIG. 6 illustrates an example personal mobile device 1, in accordance with embodiments of the present disclosure. FIG. 6 depicts personal mobile device 1 having a speaker 7. Speaker 7 is merely an example, and it is understood that personal mobile device 1 may be used in connection with a variety of transducers including magnetic coil loudspeakers, piezo speakers, haptic feedback transducers, and others. In addition or alternatively, personal mobile device 1 may be coupled to a headset 3 in the form of a pair of earbud speakers 8A and 8B. Headset 3 depicted in FIG. 6 is merely an example, and it is understood that personal mobile device 1 may be used in connection with a variety of audio transducers, including without limitation, headphones, earbuds, in-ear earphones, and external speakers. A plug 4 may provide for connection of headset 3 to an electrical terminal of personal mobile device 1. Personal mobile device 1 may provide a display to a user and receive user input using a touch screen 2, or alternatively, a standard liquid crystal display (LCD) may be combined with various buttons, sliders, and/or dials disposed on the face and/or sides of personal mobile device 1. As also shown in FIG. 6, personal mobile device 1 may include an integrated circuit (IC) 9 for generating an analog signal for transmission to speaker 7, headset 3, and/or another transducer.

Figure 7:
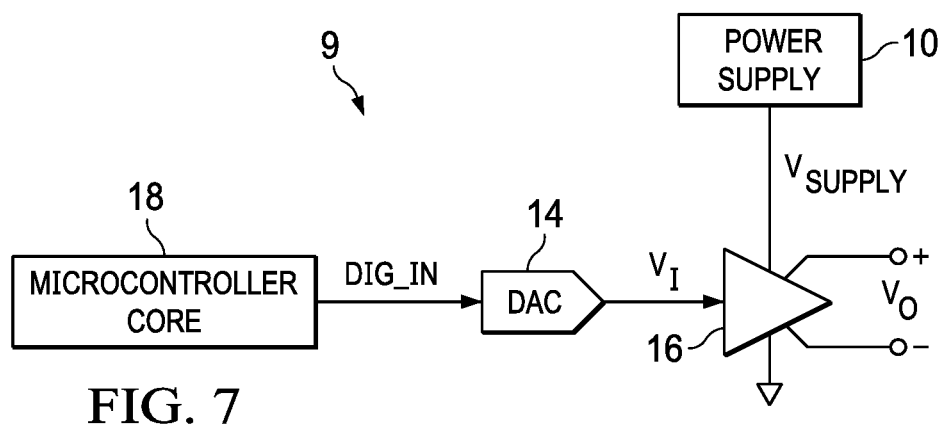
FIG. 7 illustrates a block diagram of selected components of an example integrated circuit of a personal mobile device for driving a transducer, in accordance with embodiments of the present disclosure.

FIG. 7 illustrates a block diagram of selected components of an example IC 9 of a personal mobile device for driving a transducer, in accordance with embodiments of the present disclosure. As shown in FIG. 7, a microcontroller core 18 may supply a digital input signal DIG_IN to a digital-to-analog converter (DAC) 14, which may convert the digital input signal to an analog input signal $V_{IN}$. DAC 14 may supply analog signal Vi to an amplifier 16 which may amplify or attenuate analog input signal Vi to provide a differential audio output signal $V_O$, which may operate a speaker, a headphone transducer, a piezoelectric transducer, a haptic feedback transducer, a line level signal output, and/or other suitable output. In some embodiments, DAC 14 may be an integral component of amplifier 16. A power supply 10 may provide the power supply rail inputs of amplifier 16. In some embodiments, power supply 10 may comprise a switched-mode power converter, as described in greater detail below. Although FIGS. 6 and 7 contemplate that IC 9 resides in a personal mobile device, systems and methods described herein may also be applied to electrical and electronic systems and devices other than a personal mobile device, including transducer systems for use in a computing device larger than a personal mobile device, an automobile, a building, or other structure.

Figure 8:
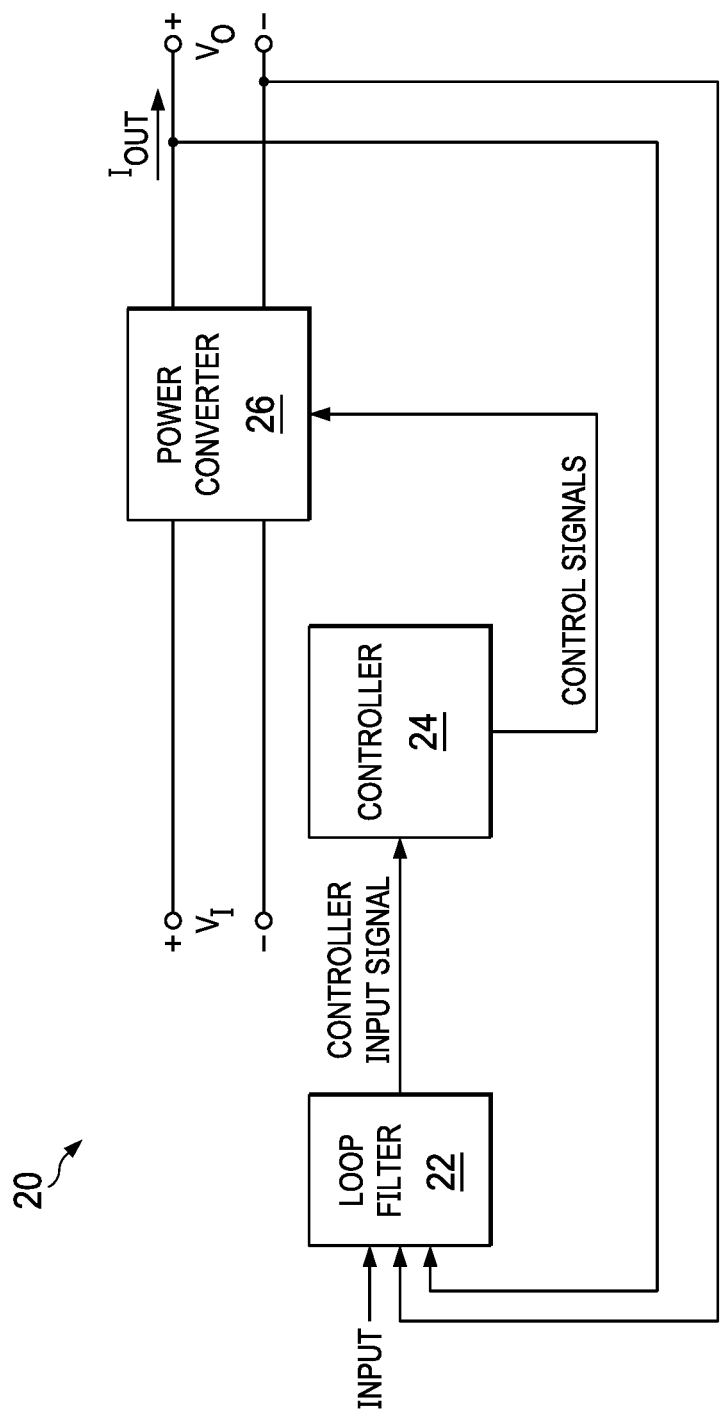
FIG. 8 illustrates a block and circuit diagram of selected components of an example switched mode amplifier, in accordance with embodiments of the present disclosure.

FIG. 8 illustrates a block and circuit diagram of selected components of an example switched mode amplifier 20, in accordance with embodiments of the present disclosure. In some embodiments, switched mode amplifier 20 may implement all or a portion of amplifier 16 described with respect to FIG. 7. As shown in FIG. 8, switched mode amplifier 20 may comprise a loop filter 22, a controller 24, and a power converter 26.

Loop filter 22 may comprise any system, device, or apparatus configured to receive an input signal (e.g., audio input signal $V_{IN}$ or a derivative thereof) and a feedback signal (e.g., audio output signal $V_O$, a derivative thereof, or other signal indicative of audio output signal $V_O$) and based on such input signal and feedback signal, generate a controller input signal to be communicated to controller 24. In some embodiments, such controller input signal may comprise a signal indicative of an integrated error between the input signal and the feedback signal. In other embodiments, such controller input signal may comprise a signal indicative of a target current signal to be driven as an output current $I_{OUT}$ or a target voltage signal to be driven as an output voltage $V_O$ to a load coupled to the output terminals of second control loop 28.

Controller 24 may comprise any system, device, or apparatus configured to, based on an input signal (e.g., input signal INPUT), output signal $V_O$, and/or other characteristics of switched mode amplifier 20, control switching of switches integral to power converter 26 in order to transfer electrical energy from a power supply $V_{SUPPLY}$ to the load of switched-mode amplifier 20 in accordance with the input signal.

Power converter 26 may comprise any system, device, or apparatus configured to receive at its input a voltage $V_{SUPPLY}$ (e.g., provided by power supply 10), and generate at its output an output voltage $V_O$. In some embodiments, voltage $V_{SUPPLY}$ may be received via input terminals of power converter 26 including a positive input terminal and a negative input terminal which may be coupled to a ground voltage. As described in greater detail in this disclosure (including, without limitation, in reference to FIGS. 9-14, below), power converter 26 may comprise a power inductor and a plurality of switches that are controlled by control signals received from controller 24 in order to convert voltage $V_{SUPPLY}$ to voltage $V_O$, such that audio output signal $V_O$ is a function of the input signal to loop filter 22.

Figure 4:
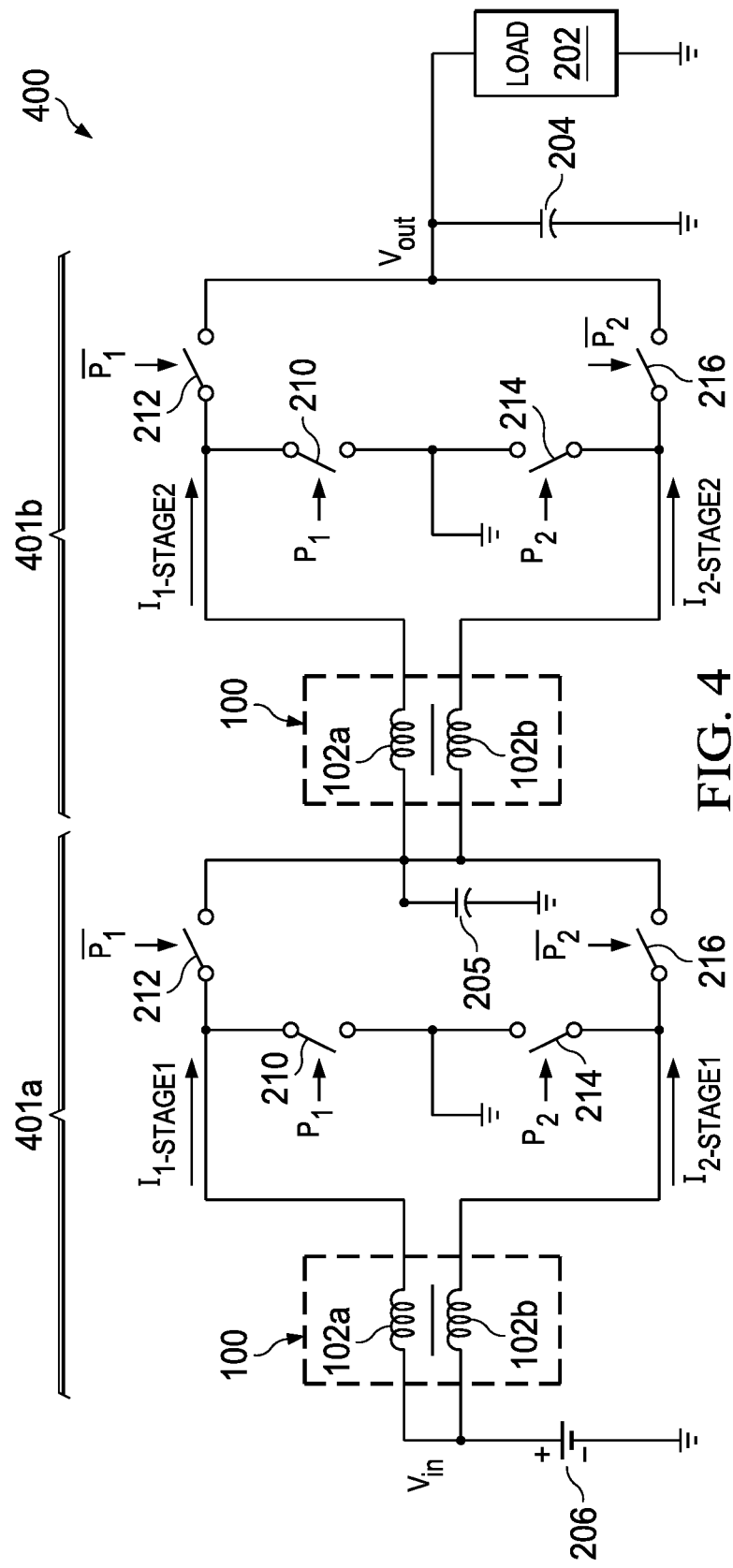
FIG. 4 illustrates a two-stage boost converter with each stage using a multi-wound integrated inductor, in accordance with embodiments of the present disclosure.
Figure 9:
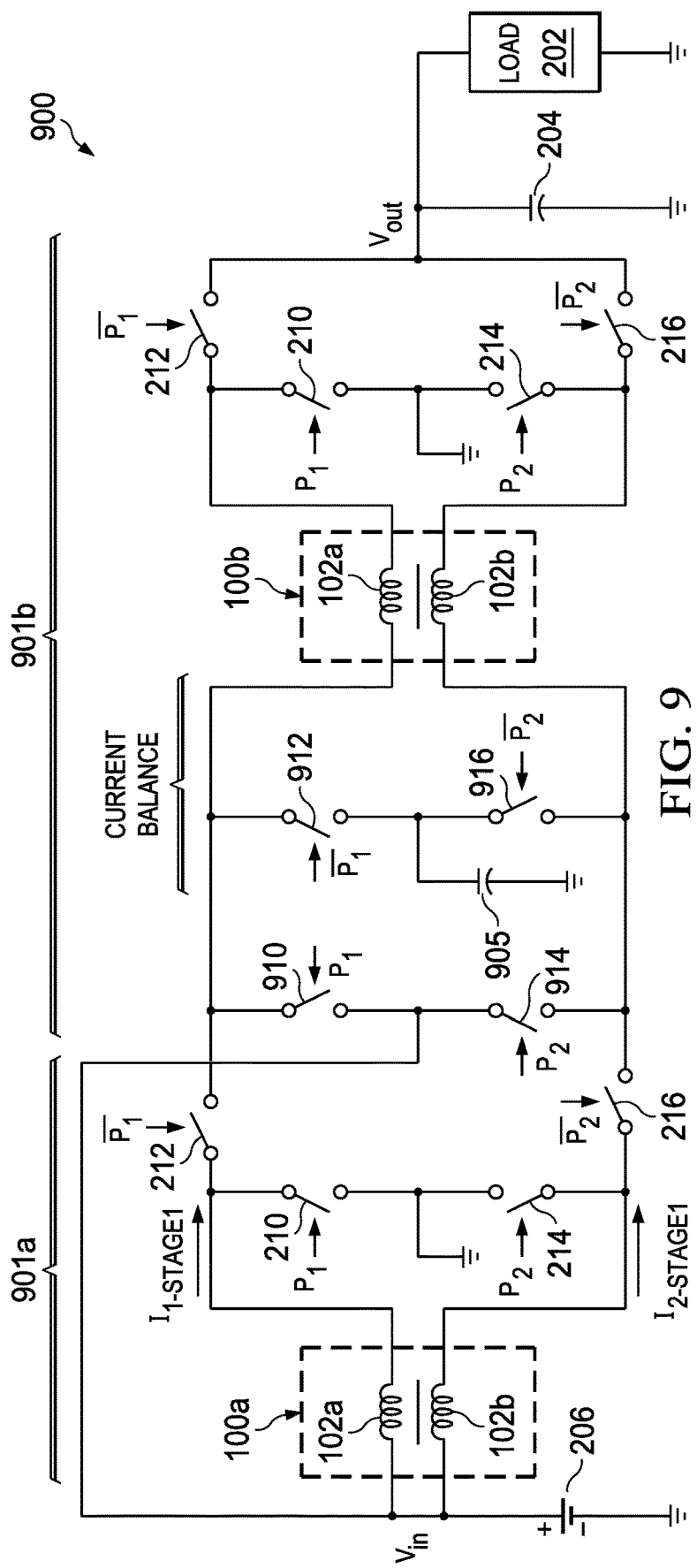
FIG. 9 illustrates selected components of an augmented two-stage boost converter with each stage using a multi-wound integrated inductor, in accordance with embodiments of the present disclosure.

FIG. 9 depicts selected components of an example augmented two-stage boost converter 900 that may be used with multi-wound inductors 100 and having a load 202, in accordance with embodiments of the present disclosure. In some embodiments, augmented two-stage boost converter 900 may be used to implement all or a portion of power supply 10 depicted in FIG. 7. In these and other embodiments, augmented two-stage boost converter 900 may be used to implement all or a portion of power converter 26 depicted in FIG. 8. Augmented two-stage boost converter 900 shown in FIG. 9 may be similar in many respects to two-stage boost converter 400 depicted in FIG. 4, and thus, only differences between augmented two-stage boost converter 900 and two-stage boost converter 400 may be discussed below. In particular, while first stage 901a of augmented two-stage boost converter 900 may be similar to first stage 401a of two-stage boost converter 400, augmented second stage 901b of augmented two-stage boost converter 900, as compared to second stage 401b of two-stage boost converter 400, may include additional switches 910, 912, 914, and 916 and capacitor 905 (in lieu of capacitor 405) arranged as shown in FIG. 9 and controlled by control signals $P_1$, $P_2$, $\overline{P_1}$, and $\overline{P_2}$ as shown in FIG. 9. As in two-stage boost converter 400, inductors 100a, 100b of each of stages 901a and 901b are dual, anti-wound inductors comprising a plurality of coils including coils 102a and 102b and wound in such a manner that a magnetic field in a core 104 produced by coils 102a and 102b cancel when currents through coils 102a and 102b are positive.

Figure 10A:
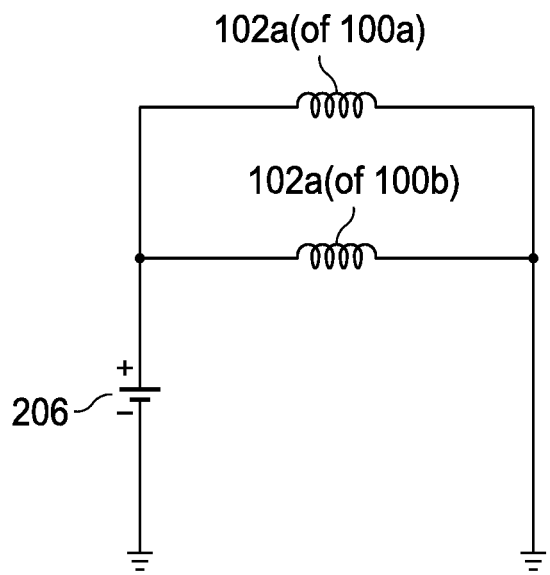
FIGS. 10A and 10B depict equivalent circuit diagrams showing connectivity of selected components of the augmented two-stage boost converter of FIG. 9 based on the values of switch control signals for the augmented two-stage boost converter, in accordance with embodiments of the present disclosure.
Figure 10B:
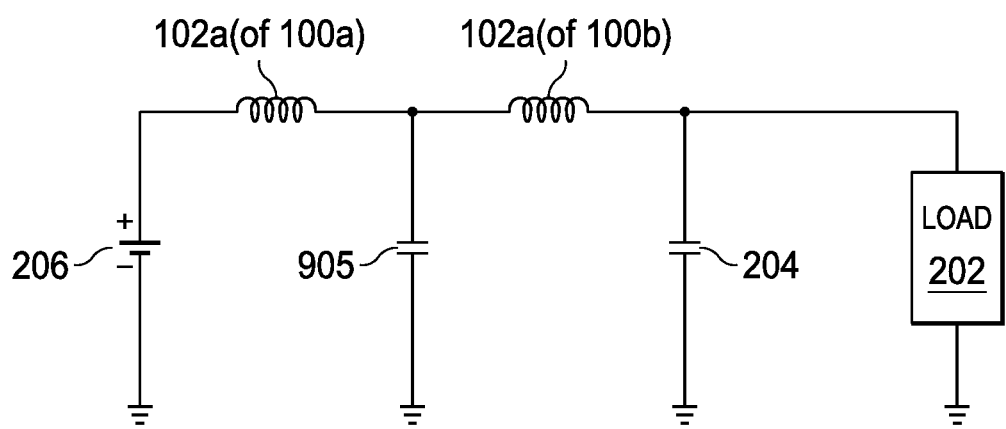

FIGS. 10A and 10B depict equivalent circuit diagrams showing connectivity of selected components of augmented two-stage boost converter 900 based on the values of switch control signals for augmented two-stage boost converter 900, in accordance with embodiments of the present disclosure. In particular, FIG. 10A depicts connectivity of top coils 102a of each of inductors 100a and 100b when control signal $P_1$ is asserted (and control signal $\overline{P_1}$ is deasserted) and FIG. 10B depicts connectivity of top coils 102a of each of inductors 100a and 100b when control signal $P_1$ is deasserted (and control signal $\overline{P_1}$ is asserted). For purposes of clarity of exposition, FIGS. 10A and 10B neglect all resistive switch losses.

As seen in FIG. 10A, when control signal $P_1$ is asserted (and control signal $\overline{P_1}$ is deasserted), top coils 102a of inductors 100a and 100b are in parallel to the power supply of battery 206 and ground. The configuration shown in FIG. 10A is a charging phase of augmented two-stage boost converter 900 in which energy is stored in top coils 102a. As seen in FIG. 10B, when control signal $P_1$ is deasserted (and control signal $\overline{P_1}$ is asserted), top coils 102a of inductors 100a and 100b are in series to the power supply of battery 206 and ground. The configuration shown in FIG. 10A is a transfer phase of augmented two-stage boost converter 900 in which energy is transferred from top coils 102a to capacitor 204 and load 202.

Thus, the unique behavior of charging coils 102a from the two stages in parallel and transferring stored energy from coils 102a in series may be an advantage of this architecture. The bottom coils 102b of inductors 100a and 100b may be controlled in a similar manner.

Because first stage 901a and augmented second stage 901b charge in parallel and transfer in series, the total boost voltage ratio is the sum of the contribution of each stage, as given by:

$$\frac{V_{out}}{V_{in}} = \frac{2}{1-D} \quad (4)$$

assuming no resistive losses. Equation 4 shows that the boost action of each stage 901a, 901b combines additively, in contrast to two-stage boost converter 400 in which the boost action of each stage 401a, 401b combines multiplicatively. As a result, augmented two-stage boost converter 900 may require a smaller duty cycle than single-stage boost converter 200 in order to achieve the same boost ratio (though to a lesser extent than two-stage converter 400) which may minimize current ripple.

When control signal $P_1$ of augmented two-stage boost converter 900 transitions from asserted to deasserted (and control signal $\overline{P_1}$ transitions from deasserted to asserted), it is possible that currents $I_{1\text{-}STAGE1}$ and $I_{1\text{-}STAGE2}$ in coils 102a may not be exactly equal. This unequal current may occur because when control signal $P_1$ is asserted, the conduction path resistance for coils 102a of inductors 100a and 100b may be different (e.g., inductor 100b may have an extra switch in its conduction path when control signal $P_1$ is asserted that can add switch resistance). When two inductors with different currents are connected in series, the current in one (or both) of the inductors must change rapidly to satisfy continuity. However, rapid changes of current in inductors may generate large, potentially damaging voltages in the circuit. To solve this problem, switch 912 may couple capacitor 905 between the common electrical node of coils 102a (when control signal $P_1$ is deasserted) and ground, providing an alternative path to any such excess current. For bottom coils 102b of inductors 100a and 100b, switch 916 may be used for a similar purpose for which switch 912 is used.

In contrast with capacitor 405 of two-stage boost converter 400, capacitor 905 may be much smaller with minimal impact to total circuit area. In fact, in some instances such capacitor could have a sufficiently small capacitance that capacitor 905 may be formed within the integrated circuit of augmented two-stage power converter 900. A natural consequence of the architecture of augmented two-stage power converter 900 is that capacitor 905 may balance current between first stage 901a and augmented second stage 901b.

Figure 11A:
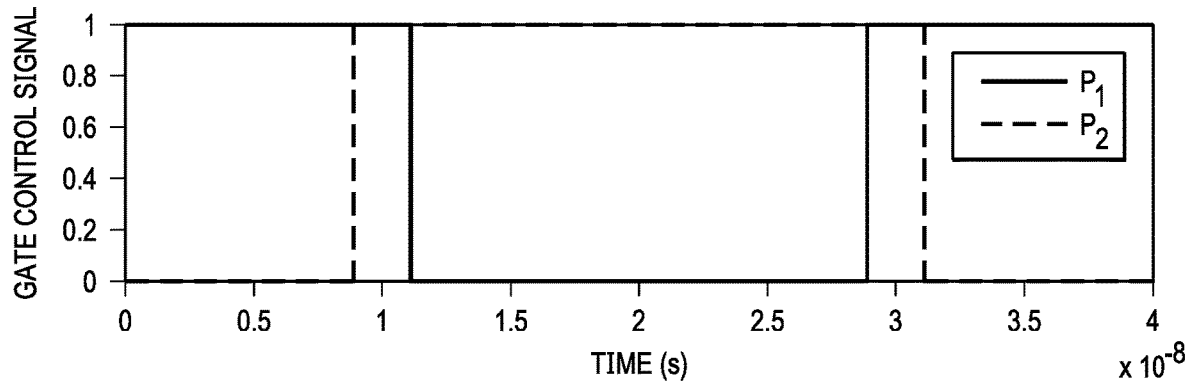
FIGS. 11A-11C depict a circuit simulation of currents for the multi-wound integrated inductors of the augmented two-stage boost converter shown in FIG. 9 over one pulse-width modulation cycle, in accordance with embodiments of the present disclosure.
Figure 11B:
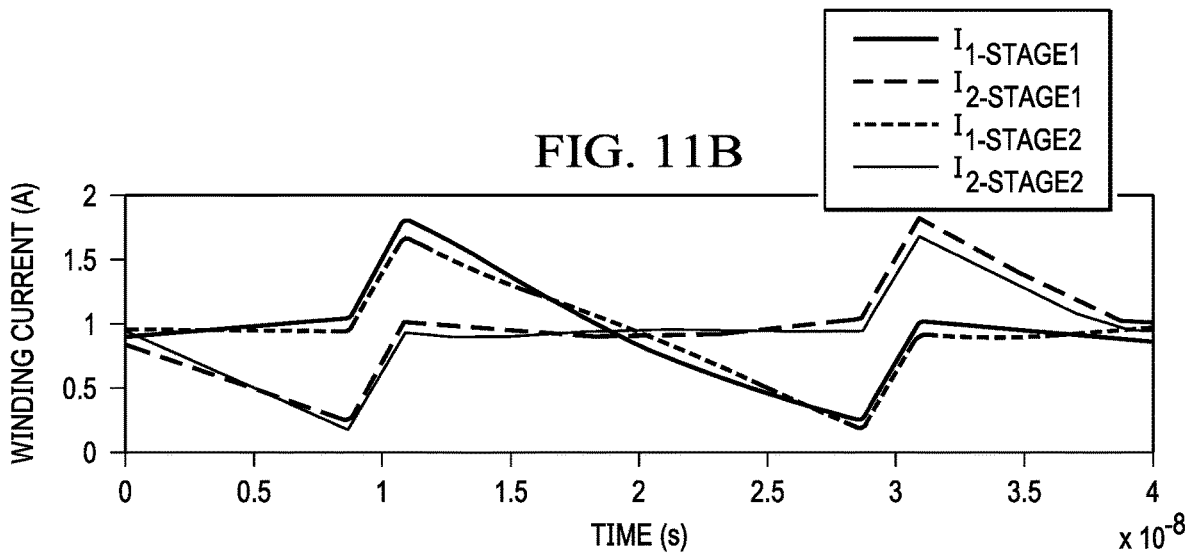
Figure 11C:
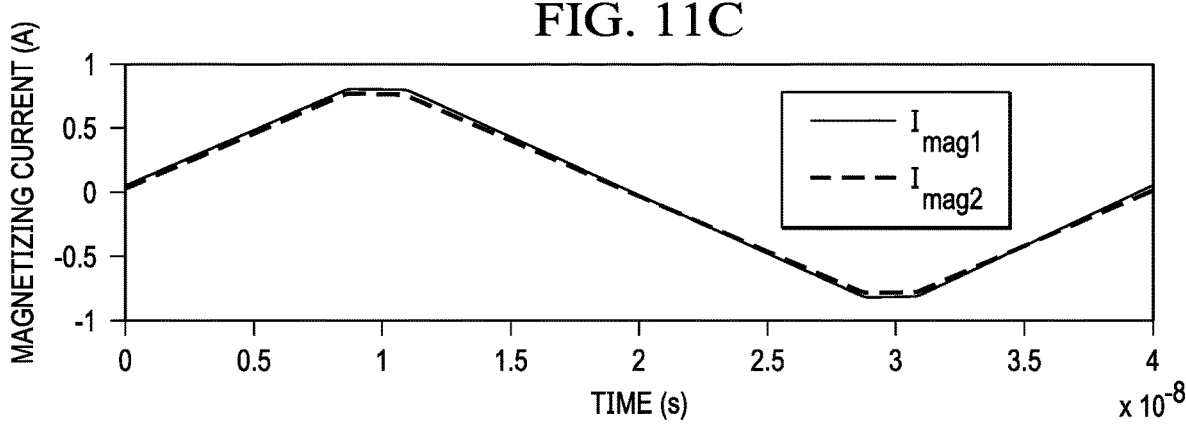

FIGS. 11A-11C depict a circuit simulation of currents for the multi-wound integrated inductors of the augmented two-stage boost converter shown in FIG. 9 over one pulse-width modulation cycle, in accordance with embodiments of the present disclosure. FIG. 11A depicts example control signals $P_1$ and $P_2$ and FIG. 11B depicts currents of coils 102a and 102b of inductors 100a and 100b. During the states when either control signal $P_1$ is asserted and control signal $P_2$ is deasserted or control signal $P_1$ is deasserted and control signal $P_2$ is asserted, at least of a pair of coils 102 is coupled in series to load 202 as shown in FIG. 10B. In these states, energy may be transferred from the magnetic fields of inductors 100A and 100B at the same time energy may be simultaneously stored in the magnetic field. In effect, in such states, energy may be transferred from one coil 102 of an inductor 100 to the other coil 102 of the inductor. Such transformer action may keep excessive energy from building up in magnetic core 104, thereby potentially preventing early saturation.

Augmented two-stage power converter 900 may prevent current saturation because it may minimize the total magnetic field in magnetic core 104, thereby minimizing the amount of magnetic energy stored in magnetic core 104. The total magnetic field in magnetic core 104 may be proportional to magnetization current, $I_{mag}$, which (for each inductor 100) may defined as:

$$I_{mag} = I_1 - I_2 \quad (5)$$

When magnetization current $I_{mag}$ is greater than or equal to magnetization current saturation limit $I_{diff}^{sat}$, magnetic core 104 may saturate.

FIG. 11C depicts magnetizing currents $I_{mag1}$ and $I_{mag2}$ for inductors 100a and 100b, respectively. When control signals $P_1$ and $P_2$ are both asserted, currents in coils 102 are both increasing because both are coupled in parallel between power supply and ground, as previously shown in FIG. 10A. However, during this state, the magnetizing currents $I_{mag1}$ and $I_{mag2}$ stay relatively flat because the flux generated by each coil 102 is changing at equal rates, and thus the difference remains constant. This constant may, in effect, create a "flat-top" to the magnetizing current waveforms as shown in FIG. 11C that prevents the magnetizing currents $I_{mag1}$ and $I_{mag2}$ from saturating.

Figure 1A:
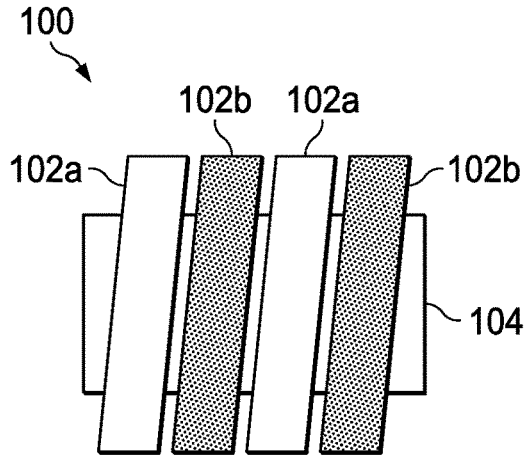
FIGS. 1A and 1B depict a multi-wound integrated inductor, in accordance with embodiments of the present disclosure.
Figure 1B:
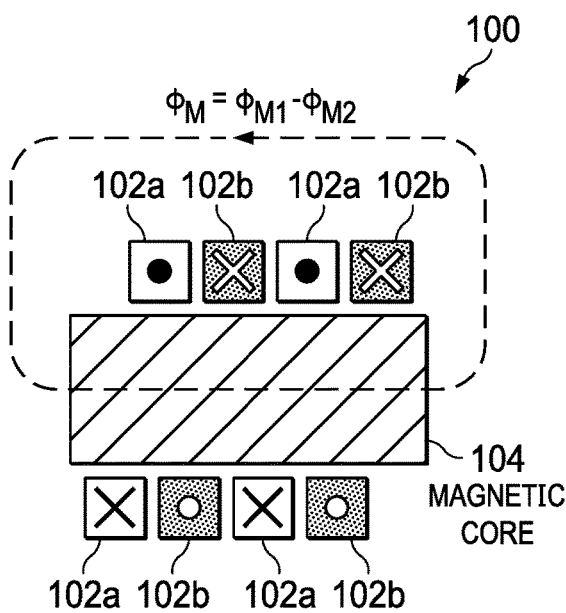
Figure 1C:
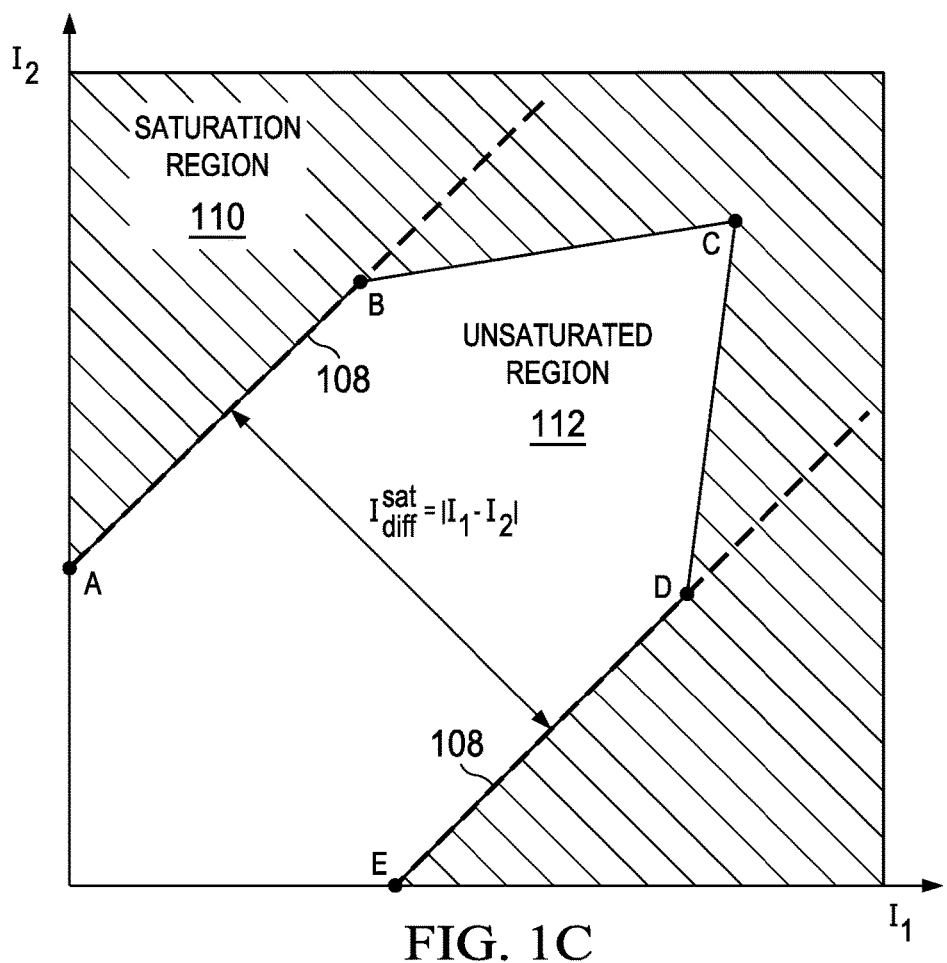
FIG. 1C illustrates a saturation profile of currents within the multi-wound integrated inductor shown in FIGS. 1A and 1B, in accordance with embodiments of the present disclosure.
Figure 2:
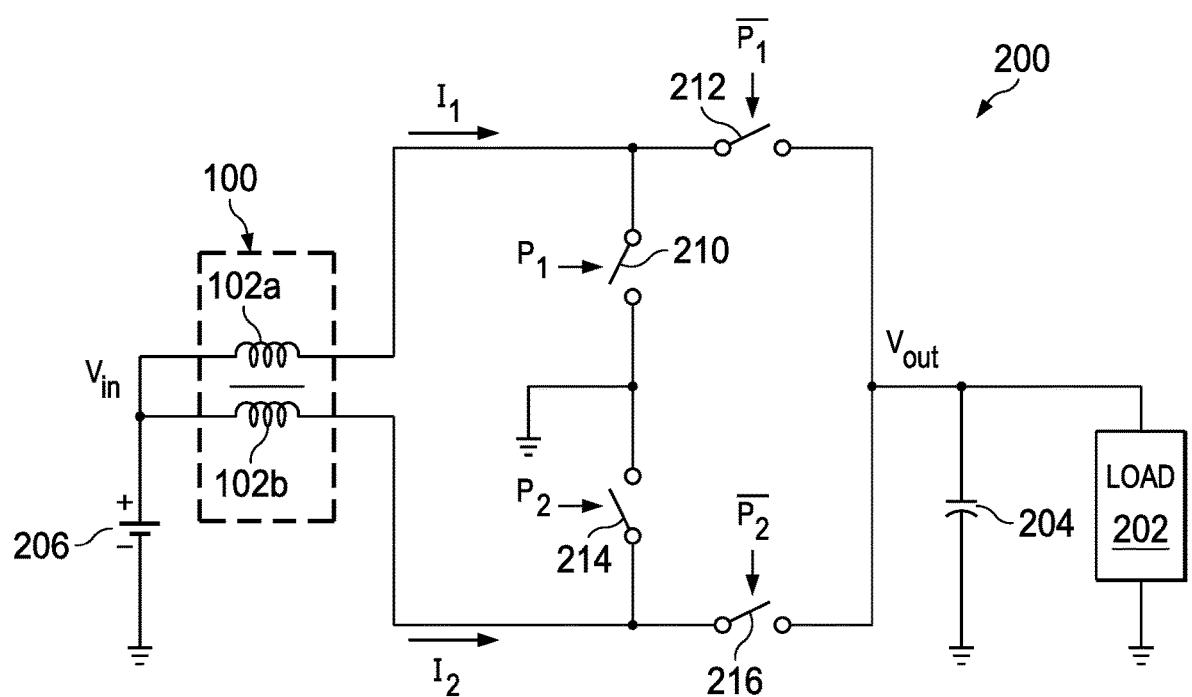
FIG. 2 illustrates a single-stage boost converter using a multi-wound integrated inductor, in accordance with embodiments of the present disclosure.
Figure 3A:
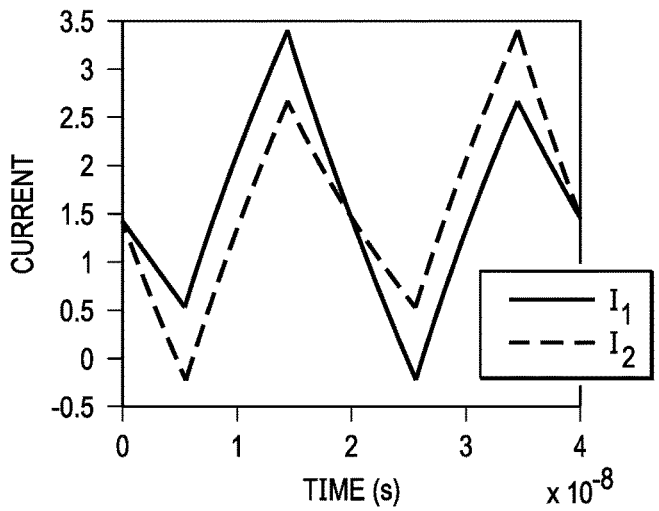
FIG. 3A depicts a circuit simulation of currents for the multi-wound integrated inductor of the single-stage boost converter shown in FIG. 2 over one pulse-width modulation cycle, in accordance with embodiments of the present disclosure.
Figure 5A:
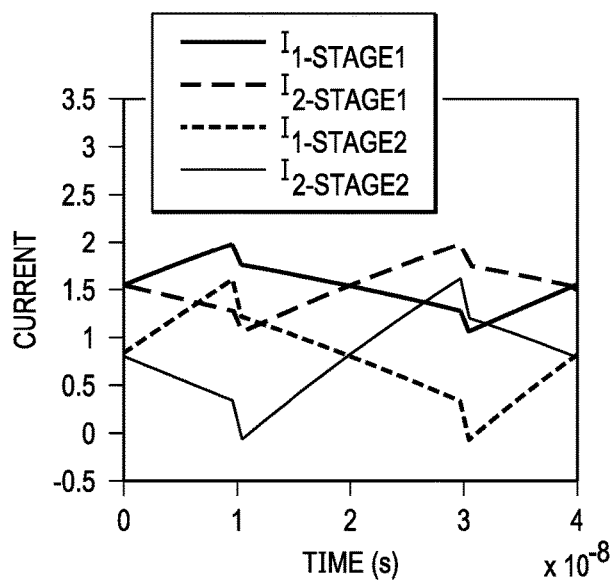
FIG. 5A depicts a circuit simulation of currents for the multi-wound integrated inductors of the two-stage boost converter shown in FIG. 4 over one pulse-width modulation cycle, in accordance with embodiments of the present disclosure.
Figure 12A:
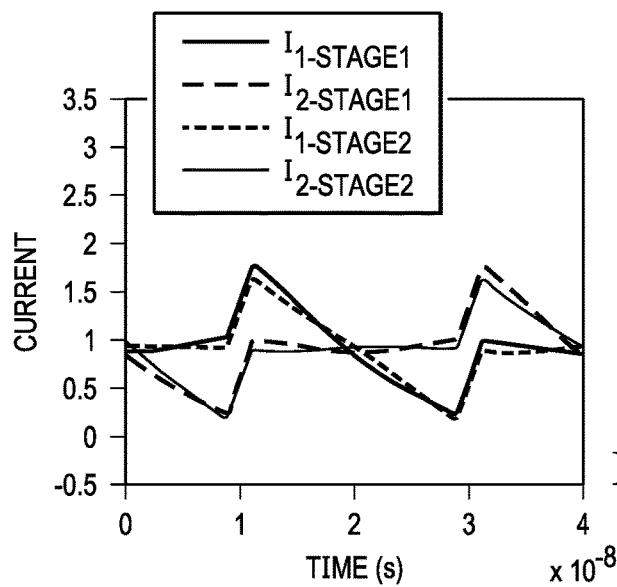
FIG. 12A depicts a circuit simulation of currents for the multi-wound integrated inductors of the augmented two-stage boost converter shown in FIG. 9 over one pulse-width modulation cycle, in accordance with embodiments of the present disclosure.

FIG. 12A depicts a circuit simulation of currents $I_{1\text{-}STAGE1}$, $I_{2\text{-}STAGE1}$, $I_{1\text{-}STAGE2}$, and $I_{2\text{-}STAGE2}$ for augmented two-stage boost converter 900 over one pulse-width modulation cycle, in accordance with embodiments of the present disclosure. As compared to FIG. 3A, the currents shown in FIG. 12A have a significantly smaller ripple magnitude than single-stage boost converter 200 converter. Additionally, as compared to FIG. 5A, the currents shown in FIG. 12A are more balanced than in two-stage power converter 400.

Figure 3B:
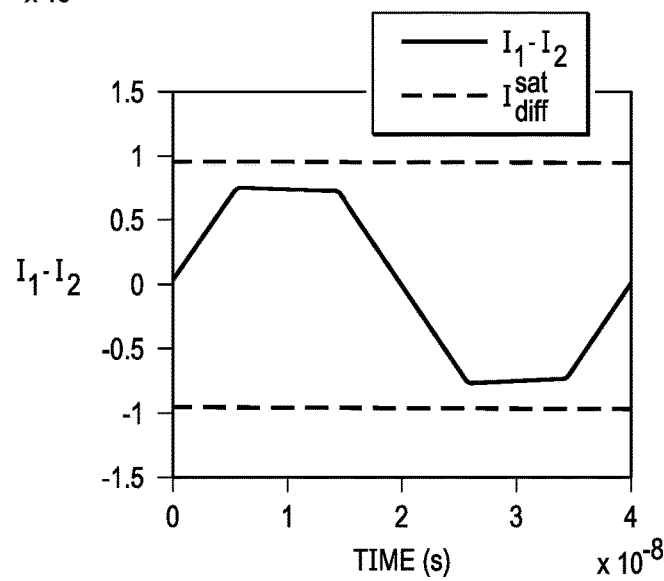
FIG. 3B depicts a circuit simulation of a current difference and a current saturation level for the multi-wound integrated inductor of the single-stage boost converter shown in FIG. 2, in accordance with embodiments of the present disclosure.
Figure 3C:
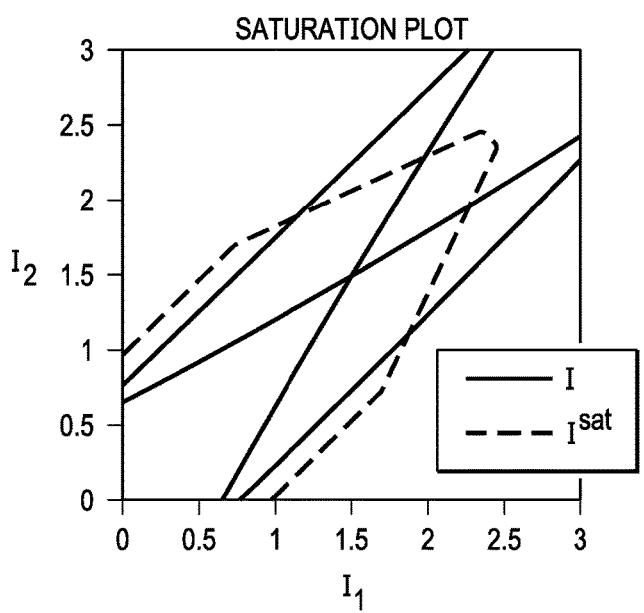
FIG. 3C illustrates a saturation profile of currents within the multi-wound integrated inductor of the single-stage boost converter shown in FIG. 2, in accordance with embodiments of the present disclosure.
Figure 5B:
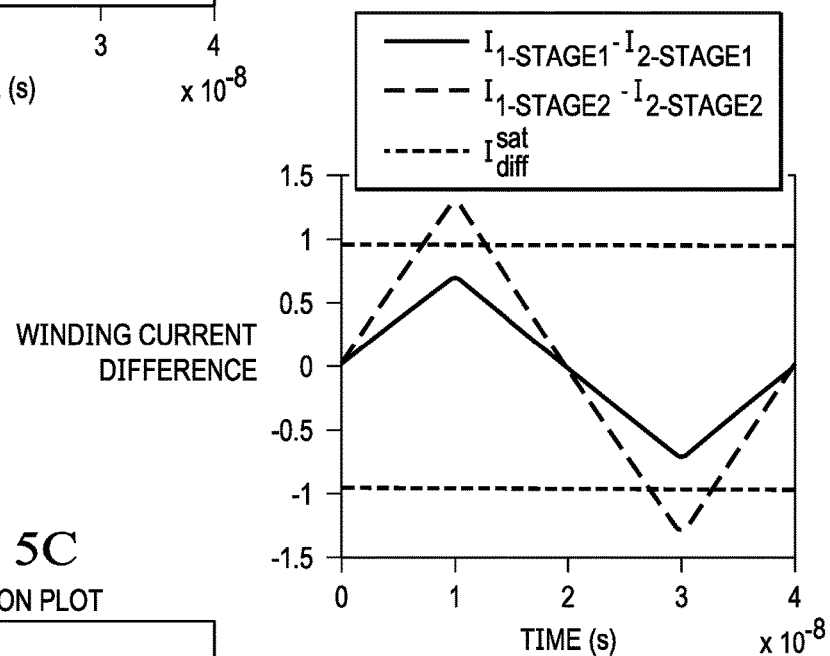
FIG. 5B depicts a circuit simulation of a current difference and a current saturation level for the multi-wound integrated inductors of the two-stage boost converter shown in FIG. 4, in accordance with embodiments of the present disclosure.
Figure 5C:
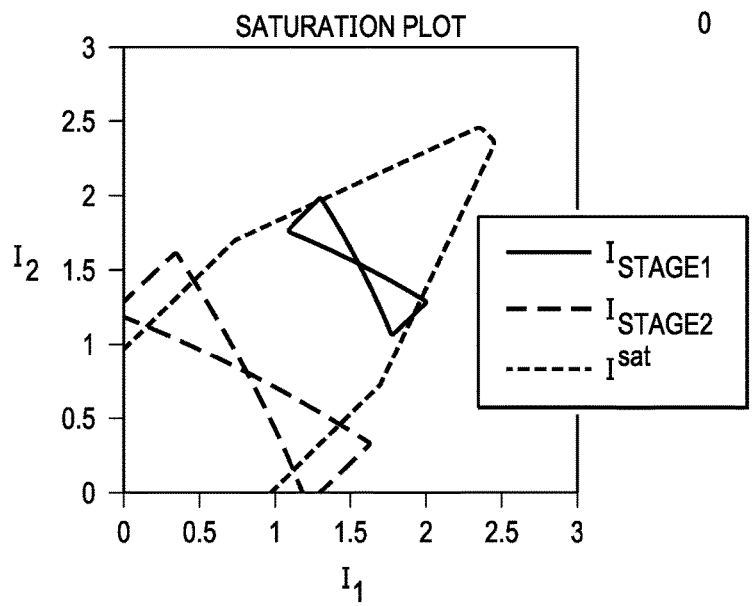
FIG. 5C illustrates a saturation profile of currents within the multi-wound integrated inductors of the two-stage boost converter shown in FIG. 4, in accordance with embodiments of the present disclosure.
Figure 12B:
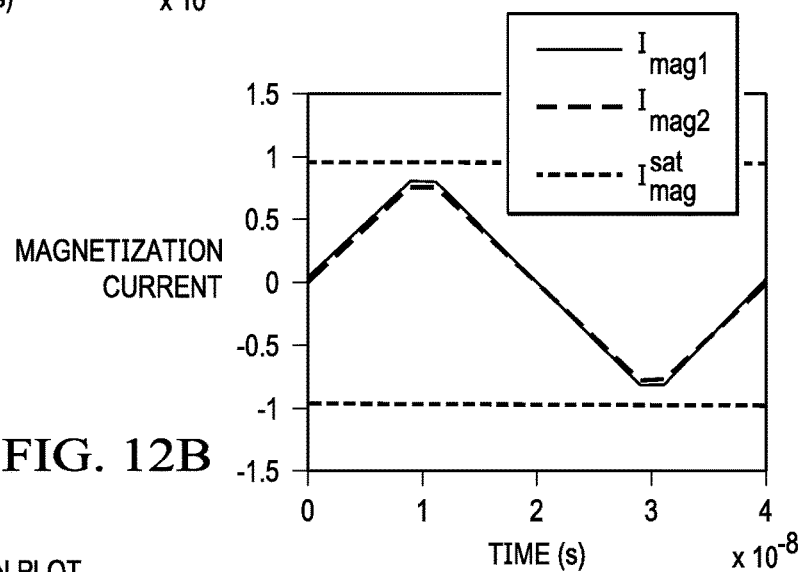
FIG. 12B depicts a circuit simulation of magnetization currents and a current saturation level for the multi-wound integrated inductors of the augmented two-stage boost converter shown in FIG. 9, in accordance with embodiments of the present disclosure.
Figure 12C:
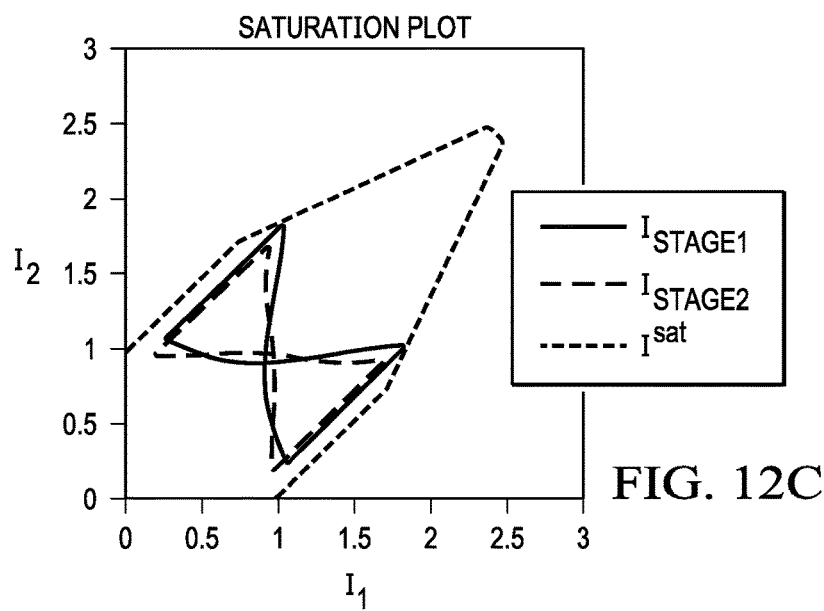
FIG. 12C illustrates a saturation profile of currents within the multi-wound integrated inductors of the augmented two-stage boost converter shown in FIG. 9, in accordance with embodiments of the present disclosure.

FIG. 12B depicts a circuit simulation of magnetization currents $I_{mag1}$ and $I_{mag2}$ and a magnetization current saturation limit $I_{diff}^{sat}$ for inductors 100a and 100b of augmented two-stage boost converter 900, in accordance with embodiments of the present disclosure. FIG. 12C illustrates a saturation profile of currents within inductors 100a and 100b of augmented two-stage boost converter shown in FIG. 9, in accordance with embodiments of the present disclosure. Compared with the performance of single-stage boost converter 200 as shown in FIGS. 3B and 3C and the performance of two-stage boost converter 400 as shown in FIGS. 5B and 5C, augmented two-stage boost converter 900 may more readily satisfy saturation current constraints.

Figure 13:
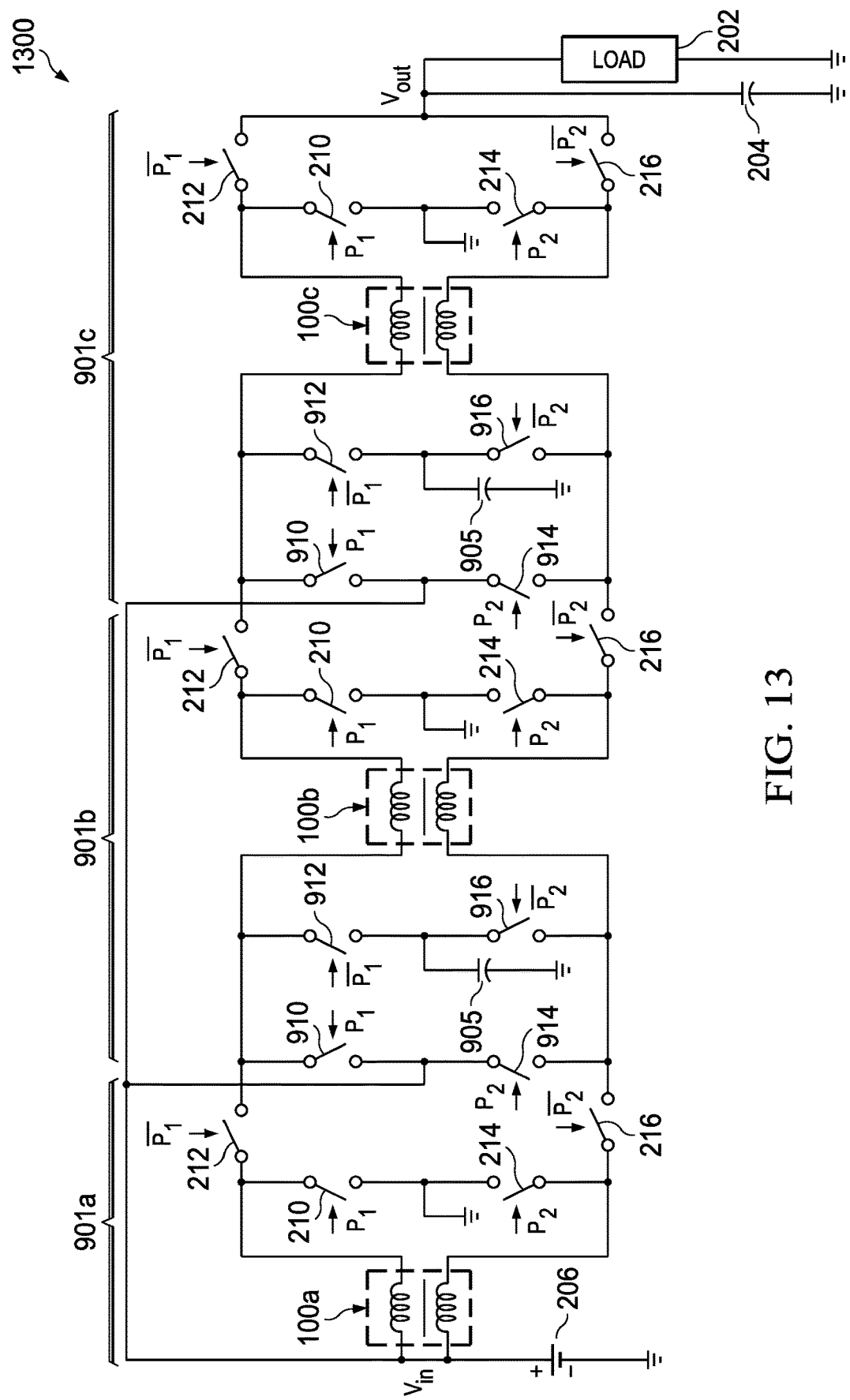
FIG. 13 illustrates selected components of an augmented multi-stage boost converter with each stage using a multi-wound integrated inductor, in accordance with embodiments of the present disclosure.

The concepts used to create augmented two-stage boost converter 900 may be extended to create multi-stage architectures. For example, FIG. 13 depicts selected components of an example augmented multi-stage boost converter 1300 that may be used with multi-wound inductors 100 and having a load 202, in accordance with embodiments of the present disclosure. In some embodiments, augmented multi-stage boost converter 1300 may be used to implement all or a portion of power supply 10 depicted in FIG. 7. In these and other embodiments, augmented two-stage boost converter 1300 may be used to implement all or a portion of power converter 26 depicted in FIG. 8. Augmented multi-stage boost converter 1300 shown in FIG. 13 may be similar in many respects to augmented two-stage boost converter 900 depicted in FIG. 9, and thus, only differences between augmented multi-stage boost converter 1300 and augmented two-stage boost converter 900 may be discussed below. The main difference between augmented multi-stage boost converter 1300 and augmented two-stage boost converter 900 is that augmented multi-stage boost converter 1300 comprises three stages, in which first stage 901a and second stage 901b are substantially identical to those of augmented two-stage boost converter 900, with third stage 901c being a copy of second stage 901b. Augmented multi-stage boost converter 1300 may operate similar to that of augmented two-stage boost converter 900: when control signal $P_1$ is asserted and control signal $\overline{P_1}$ is deasserted, all top coils 102a of all three inductors 100a, 100b, and 100c may be coupled in parallel between the supply voltage and ground and when control signal $P_1$ is deasserted and control signal $\overline{P_1}$ is asserted, top coils 102a of all three inductors 100a, 100b, and 100c may be coupled in series between the supply voltage and ground. Other boost converter circuits may be implemented by adding additional augmented stages like second stage 901b to form higher-order multi-stage designs.

Figure 14:
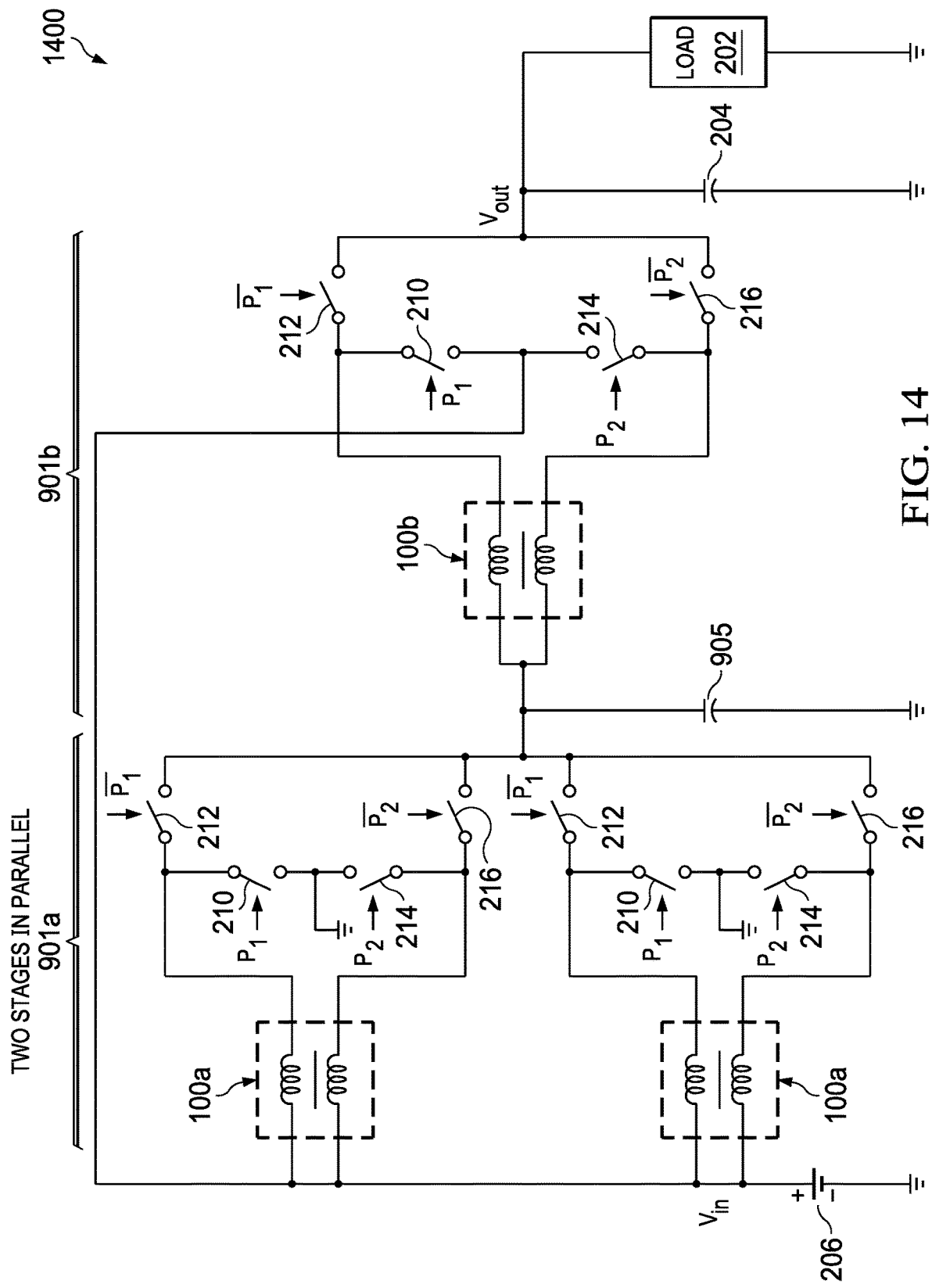
FIG. 14 depicts selected components of an example augmented multi-stage boost converter, in accordance with embodiments of the present disclosure.

As another example, FIG. 14 depicts selected components of an example augmented multi-stage boost converter 1400 that may be used with multi-wound inductors 100 and having a load 202, in accordance with embodiments of the present disclosure. In some embodiments, augmented multi-stage boost converter 1400 may be used to implement all or a portion of power supply 10 depicted in FIG. 7. In these and other embodiments, augmented two-stage boost converter 1400 may be used to implement all or a portion of power converter 26 depicted in FIG. 8. In augmented multi-stage boost converter 1400, a first stage may comprise two (or more) first stage sections 901a in parallel. Such parallelization may allow for division of current between coils 102a and 102b. Other boost converter circuits may be implemented by adding any suitable combination of parallel and augmented stages.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A boost converter comprising:
   a first stage comprising a first dual anti-wound inductor constructed such that its windings generate opposing magnetic fields in its magnetic core;
   a second stage comprising a second dual anti-wound inductor constructed such that its windings generate opposing magnetic fields in its magnetic core; and
   control circuitry for controlling the first stage and the second stage to have a plurality of phases comprising:
      a first phase wherein a first coil of the first dual anti-wound inductor and a second coil of the second dual anti-wound inductor are coupled in parallel between a power supply and a ground voltage; and
      a second phase wherein the first coil of the first dual anti-wound inductor and the second coil of the second dual anti-wound inductor are coupled in series between the power supply and the ground voltage.

2. The boost converter of claim 1, the plurality of phases further comprising:
   a third phase wherein a third coil of the first dual anti-wound inductor and a fourth coil of the second dual anti-wound inductor are coupled in parallel between the power supply and the ground voltage; and
   a fourth phase wherein the third coil of the first dual anti-wound inductor and the fourth coil of the second dual anti-wound inductor are coupled in series between the power supply and the ground voltage.

3. The boost converter of claim 1, further comprising a capacitor and a plurality of switches, wherein the control circuitry is further configured to offload excess current between the first dual anti-wound inductor and the second dual anti-wound inductor onto the capacitor to balance the first dual anti-wound inductor and the second dual anti-wound inductor and prevent excess voltage build up in the first dual anti-wound inductor and the second dual anti-wound inductor.

4. The boost converter of claim 1, further comprising a third stage comprising a third dual anti-wound inductor constructed such that its windings generate opposing magnetic fields in its magnetic core and wherein the control circuit is further configured to control the first stage, the second stage, and the third stage such that:
   in the first phase, the first coil of the first dual anti-wound inductor, the second coil of the second dual anti-wound inductor, and a third coil of the third dual anti-wound inductor are coupled in parallel between the power supply and the ground voltage; and
   in the second phase, the first coil of the first dual anti-wound inductor, the second coil of the second dual anti-wound inductor, and the third coil of the third dual anti-wound inductor are coupled in series between the power supply and the ground voltage.

5. The boost converter of claim 1, further comprising a copy of the first stage in parallel with the first stage such that respective inputs of the first stage and the copy of the first stage are coupled to one another and such that respective outputs of the first stage and the copy of the first stage are coupled to one another.

6. An electronic device comprising:
   at least one circuit configured to receive a boosted voltage as a supply voltage to the at least one circuit; and
   a boost converter comprising:
      a first stage comprising a first dual anti-wound inductor constructed such that its windings generate opposing magnetic fields in its magnetic core;
      a second stage comprising a second dual anti-wound inductor constructed such that its windings generate opposing magnetic fields in its magnetic core; and
      control circuitry for controlling the first stage and the second stage to have a plurality of phases comprising:
         a first phase wherein a first coil of the first dual anti-wound inductor and a second coil of the second dual anti-wound inductor are coupled in parallel between a power supply and a ground voltage; and
         a second phase wherein the first coil of the first dual anti-wound inductor and the second coil of the second dual anti-wound inductor are coupled in series between the power supply and the ground voltage.

7. The electronic device of claim 6, the plurality of phases further comprising:
   a third phase wherein a third coil of the first dual anti-wound inductor and a fourth coil of the second dual anti-wound inductor are coupled in parallel between the power supply and the ground voltage; and
   a fourth phase wherein the third coil of the first dual anti-wound inductor and the fourth coil of the second dual anti-wound inductor are coupled in series between the power supply and the ground voltage.

8. The electronic device of claim 6, the boost converter further comprising a capacitor and a plurality of switches, wherein the control circuitry is further configured to offload excess current between the first dual anti-wound inductor and the second dual anti-wound inductor onto the capacitor to balance the first dual anti-wound inductor and the second dual anti-wound inductor and prevent excess voltage build up in the first dual anti-wound inductor and the second dual anti-wound inductor.

9. The electronic device of claim 6, the boost converter further comprising a third stage comprising a third dual anti-wound inductor constructed such that its windings generate opposing magnetic fields in its magnetic core and wherein the control circuit is further configured to control the first stage, the second stage, and the third stage such that:
   in the first phase, the first coil of the first dual anti-wound inductor, the second coil of the second dual anti-wound inductor, and a third coil of the third dual anti-wound inductor are coupled in parallel between the power supply and the ground voltage; and
   in the second phase, the first coil of the first dual anti-wound inductor, the second coil of the second dual anti-wound inductor, and the third coil of the third dual anti-wound inductor are coupled in series between the power supply and the ground voltage.

10. The electronic device of claim 6, the boost converter further comprising a copy of the first stage in parallel with the first stage such that respective inputs of the first stage and the copy of the first stage are coupled to one another and such that respective outputs of the first stage and the copy of the first stage are coupled to one another.

11. A method comprising, in a boost converter having a first stage comprising a first dual anti-wound inductor constructed such that its windings generate opposing magnetic fields in its magnetic core and a second stage comprising a second dual anti-wound inductor constructed such that its windings generate opposing magnetic fields in its magnetic core:
    controlling the first stage and the second stage to have a plurality of phases comprising:
        a first phase wherein a first coil of the first dual anti-wound inductor and a second coil of the second dual anti-wound inductor are coupled in parallel between a power supply and a ground voltage; and
        a second phase wherein the first coil of the first dual anti-wound inductor and the second coil of the second dual anti-wound inductor are coupled in series between the power supply and the ground voltage.

12. The method of claim 11, the plurality of phases further comprising:
    a third phase wherein a third coil of the first dual anti-wound inductor and a fourth coil of the second dual anti-wound inductor are coupled in parallel between the power supply and the ground voltage; and
    a fourth phase wherein the third coil of the first dual anti-wound inductor and the fourth coil of the second dual anti-wound inductor are coupled in series between the power supply and the ground voltage.

13. The method of claim 11, wherein:
the boost converter further comprises a capacitor and a plurality of switches; and
the method further comprises offloading excess current between the first dual anti-wound inductor and the second dual anti-wound inductor onto the capacitor to balance the first dual anti-wound inductor and the second dual anti-wound inductor and prevent excess voltage build up in the first dual anti-wound inductor and the second dual anti-wound inductor.

14. The method of claim 11, wherein:
the boost converter further comprises a third stage comprising a third dual anti-wound inductor constructed such that its windings generate opposing magnetic fields in its magnetic core; and
the method further comprising controlling the first stage, the second stage, and the third stage such that:
    in the first phase, the first coil of the first dual anti-wound inductor, the second coil of the second dual anti-wound inductor, and a third coil of the third dual anti-wound inductor are coupled in parallel between the power supply and the ground voltage; and
    in the second phase, the first coil of the first dual anti-wound inductor, the second coil of the second dual anti-wound inductor, and the third coil of the third dual anti-wound inductor are coupled in series between the power supply and the ground voltage.

15. The method of claim 11, further comprising providing a copy of the first stage in parallel with the first stage such that respective inputs of the first stage and the copy of the first stage are coupled to one another and such that respective outputs of the first stage and the copy of the first stage are coupled to one another.

\* \* \* \* \*